Oct. 27, 1936. B. C. PLACE 2,058,622
TRIM PANEL AND METHOD OF MAKING SAME
Filed Dec. 24, 1931
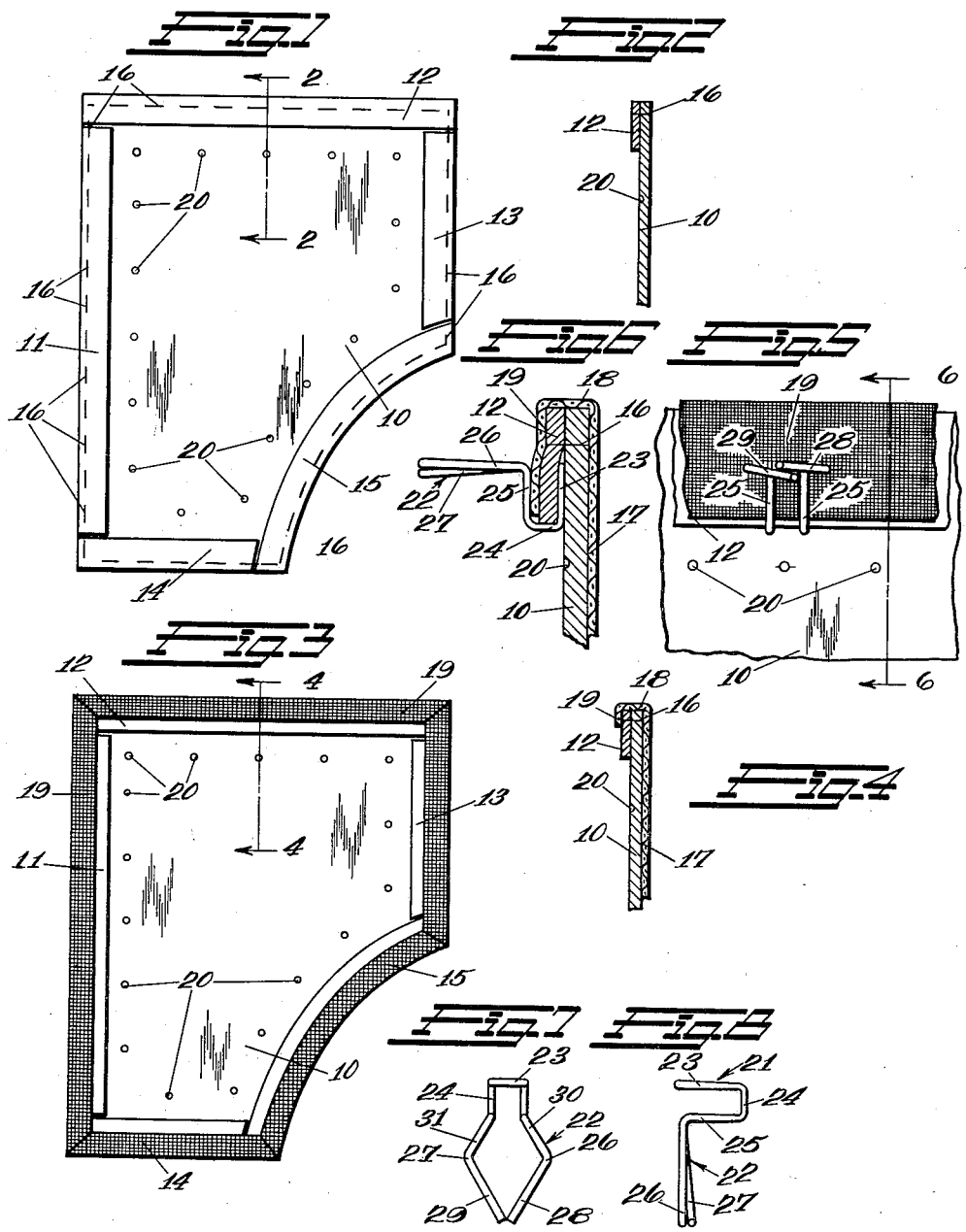
Inventor
Bien C. Place
By
Strauch & Hoffman
Attorneys Patented Oct. 27, 1936

2,058,622

UNITED STATES PATENT OFFICE 2,058,622

TRIM PANEL AND METHOD OF MAKING SAME

Bion C. Place, Detroit, Mich., assignor of one-half to George E. Gagnier, Detroit, Mich.

Application December 24, 1931, Serial No. 583,069

2 Claims. (Cl. 45—138)

This invention relates to trim panels and a method of making the same. More particularly, the invention relates to imperforate trim panels intended for application to the interior of automobile or similar bodies, and to methods of constructing the panel in such a way as to provide an extremely neat finished product that may be manufactured at very low cost.

Trim panels, as generally heretofore constructed, have consisted of a foundation or body of fibrous material of a relatively stiff nature, a covering for one face of the fibrous material in the form of a suitable fabric giving to the panel a finished appearance, and a layer of wadding arranged between the foundation or the body and the fabric covering to give to the panels a thick upholstered appearance. This invention aims to dispense with the layer of wadding and to, nevertheless, provide a panel that, at its edges, gives the appearance of being as thick as panels containing wadding. This is accomplished by doubling the thickness of the foundation or body at the edges thereof by attaching to said edges relatively narrow strips of fibrous or similar material in such way that the edges of the attached strips correspond with or are flush with the edges of the foundation or body, so that the finish material may smoothly lap the several thicknesses of fibrous or similar material concealing the cut edges of the fibrous material and at the same time producing a completed panel that has edges that sharply define evenly thickened margins simulating in appearance panels heretofore constructed so as to include a layer of wadding. The panel constructed in this way by the application of separately applied relatively narrow strips to the foundation not only possesses the characteristics of an appearance similar to that of panels provided with wadding, but at the same time the separately applied strips may serve to stiffen the margins of the panel resisting any tendency of the body to warp or bulge, and said separately applied strips preferably are also used to hold the fasteners used for the purpose of attaching the panels to the supporting structure, thus entirely avoiding the perforation of the body of the panel.

The primary object of the invention, accordingly, is to provide an automobile trim panel having an imperforate body reinforced by fibrous strips paralleling the edges of the body, and serving as a means for attaching the panel to the supporting structure.

A further object of the invention is to provide an automobile or similar trim panel having an imperforate foundation or body provided with independently applied reenforcements of fibrous or similar material paralleling the margins of the foundation or body, which reenforcements are maintained separate from the body in such manner as to permit the reenforcement to serve as carriers for the fasteners used to attach the panel to a supporting structure.

A further object of the invention is to provide a method of manufacturing foundations for automobile trim panels consisting of an imperforate body of fibrous material and reenforcing strips of fibrous material that serve the double function of stiffening the imperforate body in both directions and at the same time serving the purpose of providing means to secure fasteners to the body.

Another object of the invention is to provide an automobile or similar trim panel having fastener receiving means secured to the rear face thereof in which indicia are provided to enable the fasteners to be subsequently assembled with respect to the panel in proper position for the insertion of the shank thereof in openings in the supporting structure to which the panel is to be subsequently applied.

Further objects of the invention will appear as the description thereof proceeds with reference to the accompanying drawing in which:

Figure 1 is a rear view of a foundation provided with fastener receiving and reenforcing means of the present invention.

Figure 2 is a fragmentary sectional view on an enlarged scale taken on the plane indicated by the line 2—2 in Figure 1.

Figure 3 is a rear view of a completed panel including the foundation of Figure 1.

Figure 4 is a fragmentary sectional view on an enlarged scale taken on the plane indicated by the line 4—4 in Figure 3.

Figure 5 is a fragmentary view showing a portion of the rear of the panel having the preferred form of fastener assembled with respect to the reenforcing and fastener securing means constituting an essential part of the present invention.

Figure 6 is a sectional view taken on the plane indicated by the line 6—6 in Figure 5.

Figures 7 and 8 are side views of this preferred form of fastener as seen from two directions.

Like reference characters indicate like parts throughout the several figures.

The panel of the present invention comprises a body or foundation 10 of relatively stiff fibrous material or the like cut or stamped to the outline of the surface that is to be covered by the completed panel.

A typical door panel is illustrated, said panel having a corner thereof cut away on a curve. The edges or margins of the foundation or body 10 are reenforced by relatively narrow strips 11, 12, 13, 14, and 15 cut from suitable, preferably fibrous, material. In view of the fact that the strips are independently formed and separately applied it will be understood that they may be cut accurately to the size and formed of a substantial portion of an edge of the panel to which they are applied so that, when they are positioned upon and secured to the foundation or body, they may lie substantially flush with the margins of the body. This is an important characteristic of the present invention, since when curved margins form a part of the foundation or body as in the illustrated embodiment of the invention, it is impractical to reenforce the body by turning back the edges thereof, as has been heretofore proposed, because an even, neat appearing fold made on a smooth curve cannot, in practice, be formed in material of sufficient stiffness to serve as a suitable foundation for an automobile or similar panel. If the reenforcing strips are separately cut to the configuration of the margin and subsequently applied to the panel, it is feasible to produce a reenforced panel having an exceedingly neat and finished appearance.

The strips 11, 12, 13, 14, and 15 are attached to the rear face thereof by means of a line of stitches 16 disposed relatively close to the margins of the body, so that the edges of the strips remote from the margins of the body are maintained free of attachment thereto. Any other or equivalent mode of attaching the strips to the foundation may be used in lieu of the line of stitches, such as spaced staples, for example. The resultant reenforced panel has thickened edges having the essential neat appearance, that is, it is entirely devoid of bulges and irregularities at the margins of the body. Such a panel makes it feasible to dispense with the use of wadding between the fibrous covering subsequently applied and the other side of the body, since the covered panel at its margins, where the thickness thereof is exposed to view, has the appearance of a panel having a body of substantial thickness throughout its entire extent.

After the foundation has been strengthened and reenforced by the application of the strips 11, 12, 13, 14, and 15 in the manner just described, it is provided with a suitable fabric covering 17 of any approved form of finish material. The fabric covering 17 laps the cut edges of the body or foundation 10, as well as the adjacent cut edges of the various reenforcing strips. As indicated at 18, the fabric covering is continued so as to lap part of the reenforcing strips as indicated at 19. The fabric covering may be attached to the foundation by sewing, glueing, or otherwise.

It will be apparent that the completed panel thus presented has no perforations for fasteners in the body thereof and that it includes reenforcing strips that parallel the margins of the foundation and are applied to the foundation or body so that fasteners may be freely assembled with respect to said strip so that such strips serve as a means for carrying the fasteners at the same time that they reenforce and thicken the edges of the panel. Of course, if the panel is secured along any side by a garnish molding or the like, making a reenforcement along that side unnecessary, the latter may be omitted.

The panel may be secured to the supporting structure by assembling any snap fastener having a head in the form of a hook at suitably disposed intervals around the inside of the panel, said fasteners being hooked upon the reenforcing strips. The assembly of the fasteners with respect to the panel is made after the panel has been completely constructed. In order to guide the workmen in assembling the fasteners at the proper points along the length of the reenforcing strips, suitable indicia 20 preferably in the form of slight depressions or punch marks that may be formed in the body or foundation when it is cut to the form of the surface to be covered. Such indicia enable the men, who assemble the fasteners with respect to the panel prior to the time that the shanks thereof are snapped into the suitable opening or sockets formed in the supporting structure to receive them, to quickly and properly position the desired member of the snap fastener in the correct position on the various reenforcing strips, the intention being that a fastener is to be assembled above each mark 20 on the body of the panel. The indicia may, if desired, be formed on the strips that receive the fasteners, if this mode of procedure is preferred.

A fastener that is preferred for securing the improved panel of the present invention in place may be formed of a single piece of wire by bending the mid-portion thereof to form a hook shaped head 21, and by bending the ends of the wire to form a shank 22. The hook shaped head 21 includes an arm 23 formed from the middle of the wire bent in the form of a U, a connecting portion 24, and an arm 25 secured in spaced relation to arm 23 by said portion. The connecting portion 24 and the arm 25 consists of two strands of wire of the same length such as illustrated in the drawing. The shank of the fastener consists of two legs 26 and 27 that are bowed outwardly between the arm 25 and the tips or ends of the wire from which the fastener is constructed to provide guiding portions 28 and 29 and holding portions 30 and 31 adapted to respectively guide the shank of the fastener in an opening or socket provided to receive it, and to retain said fastener within said socket when completely entered therein as is now understood in the art.

Fasteners of the type just described may be very conveniently assembled with respect to a trim panel socket as outlined by causing the relatively free edges of the strips 11, 12, 13, 14, and 15 to be engaged within the hook-like head 21 of a multiplicity of fasteners, a fastener being located opposite each mark 20. After the panel has been equipped with fasteners, applied as just stated, it is ready for attachment to the supporting structure which is provided with openings or sockets positioned so that the indicia 20 correctly locates the fastener with respect to the body of the panel. The panel is applied by simply causing the protruding shank of the fasteners to be snapped into the various sockets or openings in the supporting structure provided to receive them.

It will be observed that since the body 10 of the panel is imperforate the heads of the fasteners engaged in the reenforcing strips are protected from contact with the finish material by a complete thickness of the fibrous material constituting said body. If other snap fasteners are used, they may be assembled with respect to the reenforcing strips in accordance with the design of the particular fastener that is employed. For example, if fasteners of the kind illustrated in my Patent #1,679,266 are to be applied, openings in the form of keyhole slots may be formed in the reenforcing strips so that the fasteners may be assembled with respect thereto after the manner described in my Patent #1,722,944.

The panel above described is intended to be constructed entirely of fibrous material. It is designed so that the fasteners may be readily assembled with respect thereto. Nevertheless it can be manufactured at a very low cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. The method of constructing a trim panel foundation for a surface a portion of which is curved in outline, which consists in die-cutting the body from a sheet of fibrous material in the desired outline, separately cutting narrow strips from a sheet of fibrous material each to the form of a substantial part of the margins of said body, applying said strips to said body so that the edges of the strips substantially aline with edges of said body regardless of the curvature of the body edges, and securing said strips to the body on lines close to the body edge so that said strips lie snugly against said body at the edges of the latter.

2. The method of claim 1 including the further step of punching indicia in position to locate fasteners applied to said strips.

BION C. PLACE.